(12) United States Patent
Getachew et al.

(10) Patent No.: US 7,924,705 B2
(45) Date of Patent: Apr. 12, 2011

(54) METHOD AND SYSTEM FOR SPAN-BASED CONNECTION AGGREGATION

(75) Inventors: Daniel Getachew, Silver Spring, MD (US); Kyle DeWayne McIntosh, Roswell, GA (US)

(73) Assignee: Ciena Corporation, Linthicum, MD (US)

( * ) Notice: Subject to any disclaimer, the term of this patent is extended or adjusted under 35 U.S.C. 154(b) by 339 days.

(21) Appl. No.: 11/712,623

(22) Filed: Mar. 1, 2007

(65) Prior Publication Data

US 2008/0212497 A1 Sep. 4, 2008

(51) Int. Cl.
*H04J 1/16* (2006.01)
*H04J 3/02* (2006.01)
*H04L 12/28* (2006.01)

(52) U.S. Cl. .................... 370/218; 370/406; 370/537
(58) Field of Classification Search .................. None
See application file for complete search history.

(56) References Cited

U.S. PATENT DOCUMENTS

| 6,178,235 B1 * | 1/2001 | Petersen et al. ............... 379/134 |
| 6,597,658 B1 * | 7/2003 | Simmons ..................... 370/221 |
| 2003/0117950 A1 * | 6/2003 | Huang ........................ 370/220 |
| 2004/0190441 A1 * | 9/2004 | Alfakih et al. ................. 370/216 |
| 2006/0250948 A1 * | 11/2006 | Zamfir et al. .................. 370/216 |

OTHER PUBLICATIONS

G. Ahn et al., "Simulator for MPLS path restoration and performance evaluation", Proceedings of Joint 4th IEEE International Conference on ATM and High-speed Intelligent Internet Symposium, Apr. 22, 2001, pp. 31-36.*

* cited by examiner

*Primary Examiner* — Daniel J Ryman
*Assistant Examiner* — Cassandra Decker
(74) *Attorney, Agent, or Firm* — Clements Bernard PLLC; Christopher L. Bernard; Tyler S. Brown

(57) ABSTRACT

The present invention provides a method and system for the restoration of an optical mesh network subsequent to the simultaneous failing of a large number of network connections due to a transmission failure. The system and method increase the restoration speed of a large number of failed network connections through connection aggregation. The system and method provide that connection aggregation is the logical bundling of a plurality of network connections across a network span. By enabling the bundling of these individual network connections transported over a particular span or spans, a network operator manages the bundle as if it were one network connection. The method and system provide that other network links support these bundled connections when the network segment that a managed bundle is traversing fails.

17 Claims, 5 Drawing Sheets

METHOD AND SYSTEM FOR SPAN-BASED CONNECTION AGGREGATION

FIELD OF THE INVENTION

The present invention relates generally to the fields of optical networking and mesh restoration techniques. More specifically, the present invention relates to a method and system for the restoration of an optical mesh network subsequent to the simultaneous failing of a large number of network connections due to a transmission failure. The method and system increase the restoration speed of a large number of failed network connections through connection aggregation. The method and system provide that connection aggregation is the logical bundling of a plurality of network connections across a network span. By enabling the bundling of these individual network connections transported over a particular span or spans, a network operator manages the bundle as if it were one network connection. The method and system provide that other network links support these bundled connections when the network segment that a managed bundle is traversing fails.

BACKGROUND OF THE INVENTION

The current models of mesh restoration known in the art do not take into account the effect of a large number of connections simultaneously failing because of a transmission failure. Such an incident, although rare, does cause outages that significantly affect a large number of users.

The additional traffic growth and bandwidth demands now experienced on optical cross connects in optical networks has created a need for a control plane enhancement in an optical cross connect that allows for traffic growth to continue while maintaining the network performance to end user customers.

Thus, what is needed is a method and system that allow a network operator to identify key segments, also called spans, in an optical mesh network where a large number of connections traverse. By enabling the bundling of these individual network connections transported over a particular span or spans, the network operator manages the bundle as if it were one network connection. Additionally, what is needed is a method and system that allow other network links to support these bundled connections when the network segment that a bundle currently is traversing fails. The present invention provides such a method and system.

BRIEF SUMMARY OF THE INVENTION

In various exemplary embodiments, the present invention provides a method and a system for restoring optical network connections using span-based connection aggregation.

In one exemplary embodiment, the present invention provides a method for restoring network connections using span-based connection aggregation. The method includes identifying a network span between a first node and a second node in a mesh network with a plurality of network nodes, wherein a plurality of individual network connections traverse; logically bundling the plurality of individual network connections in the network span together into a bundle, thereby providing a connection aggregation; managing the connection aggregation, comprised of the plurality of individual network connections, as a single network connection over the network span; maintaining a connection mapping, wherein the connection mapping contains information pertaining to the bundle, but not the individual network connections; defining one or more other network spans in the mesh network as a connection aggregation link to accommodate the bundle in the event of a transmission failure, whereby the bundle is subsequently remapped; and restoring the bundle of network connections over one of the one or more other connection aggregation links when network span that the bundle is traversing fails. When during the restoring the bundle of network connections over one of the one or more other connection aggregation links when the network span that the bundle is traversing fails, no other connection aggregation links are available, the method defaults to standard mesh restoration. The network connection between the first node and the second node has a unique call record. The method further includes one of wholly restoring the bundle of network connections as a bundle or wholly not restoring the bundle of network connections as a bundle. The method includes releasing the bundle of network connections individually when the bundle of network connections cannot be wholly restored as a bundle. The method also includes signaling a connection aggregation in the same manner as signaling a standard network connection. Connection aggregation links are optionally determined by off-line simulation. The method further includes the option of reaggregating the bundle of network connections to the original network span connection aggregation once it has been restored.

In another exemplary embodiment, the present invention provides a system for restoring network connections using span-based connection aggregation. The system includes a means for identifying a network span between a first node and a second node in a mesh network with a plurality of network nodes, wherein a plurality of individual network connections traverse; a means for logically bundling the plurality of individual network connections in the network span together into a bundle, thereby providing a connection aggregation; a means for managing the connection aggregation, comprised of the plurality of individual network connections, as a single network connection over the network span; a means for maintaining a connection mapping, wherein the connection mapping contains information pertaining to the bundle, but not the individual network connections; a means for defining one or more other network spans in the mesh network as a connection aggregation link to accommodate the bundle in the event of a transmission failure, whereby the bundle is subsequently remapped; and a means for restoring the bundle of network connections over one of the one or more other connection aggregation links when network span that the bundle is traversing fails. The system also includes a means for defaulting to a standard mesh restoration when during the restoring the bundle of network connections over one of the one or more other connection aggregation links when the network span that the bundle is traversing fails, no other connection aggregation links are available. In this system, the network connection between the first node and the second node has a unique call record. The system further includes a means for wholly restoring the bundle of network connections as a bundle or for wholly not restoring the bundle of network connections as a bundle. The system further includes a means for releasing the bundle of network connections individually when the bundle of network connections cannot be wholly restored as a bundle. The system further includes a means for signaling a connection aggregation in the same manner as signaling a standard network connection. In this system, the connection aggregation links are determined by off-line simulation. The system further includes a means for reaggregating the bundle of network connections to the original network span connection aggregation once it has been restored.

In a further exemplary embodiment, the present invention provides an apparatus for restoring network connections using span-based connection aggregation. The apparatus includes logic configured to identify a network span between a first node and a second node in a mesh network with a plurality of network nodes, wherein a plurality of individual network connections traverse; logic configured to logically bundle the plurality of individual network connections in the network span together into a bundle, thereby providing a connection aggregation; logic configured to manage the connection aggregation, comprised of the plurality of individual network connections, as a single network connection over the network span; logic configured to maintain a connection mapping, wherein the connection mapping contains information pertaining to the bundle, but not the individual network connections; logic configured to define one or more other network spans in the mesh network as a connection aggregation link to accommodate the bundle in the event of a transmission failure, whereby the bundle is subsequently remapped; and logic configured to restore the bundle of network connections over one of the one or more other connection aggregation links when network span that the bundle is traversing fails. The apparatus also includes logic for signaling a connection aggregation in the same manner as signaling a standard network connection. The apparatus further includes logic for one of wholly restoring the bundle of network connections as a bundle or wholly not restoring the bundle of network connections as a bundle. The apparatus further includes logic for releasing the bundle of network connections individually when the bundle of network connections cannot be wholly restored as a bundle.

Advantageously, the present invention provides a control plane enhancement in an optical cross connect that allows for traffic growth to continue while maintaining the network performance to end user customers. Significantly, this invention provides a faster restoration of a large number of connections that have failed. Thus, network level scalability is greatly enhanced.

There has thus been outlined, rather broadly, the features of the present invention in order that the detailed description that follows may be better understood, and in order that the present contribution to the art may be better appreciated. There are additional features of the invention that will be described and which will form the subject matter of the claims. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Additional aspects and advantages of the present invention will be apparent from the following detailed description of exemplary embodiments which are illustrated in the accompanying drawings.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the claims that follow.

Throughout the specification, the following terms are used. A bundle refers to an aggregated connection bundle. A connection aggregation is one or more network connections that are treated as one connection across a network span. A link is an Optical Signaling & Routing Protocol (OSRP) link. A connection aggregation link is an OSRP link that can support connection aggregation. A connection aggregation protect path is a series of connection aggregation enabled links to be selected from to restore a connection aggregation connection.

Connection aggregation within a plurality of mesh network span links 120 (FIGS. 1-5) is used where it is most beneficial to efficient network operation and speedy mesh restoration after transmission failures. For example, connection aggregation needs a high bundling factor. An end-to-end bundle to manage a current network is not suitable to connection aggregation bundling. An objective in implementing span-based connection aggregation and various connection aggregation links 130 (FIGS. 1-5) is to simplify the connection signaling. Another objective in implementing span-based connection aggregation is to provide an enhancement for connection restoration.

Figure 1:
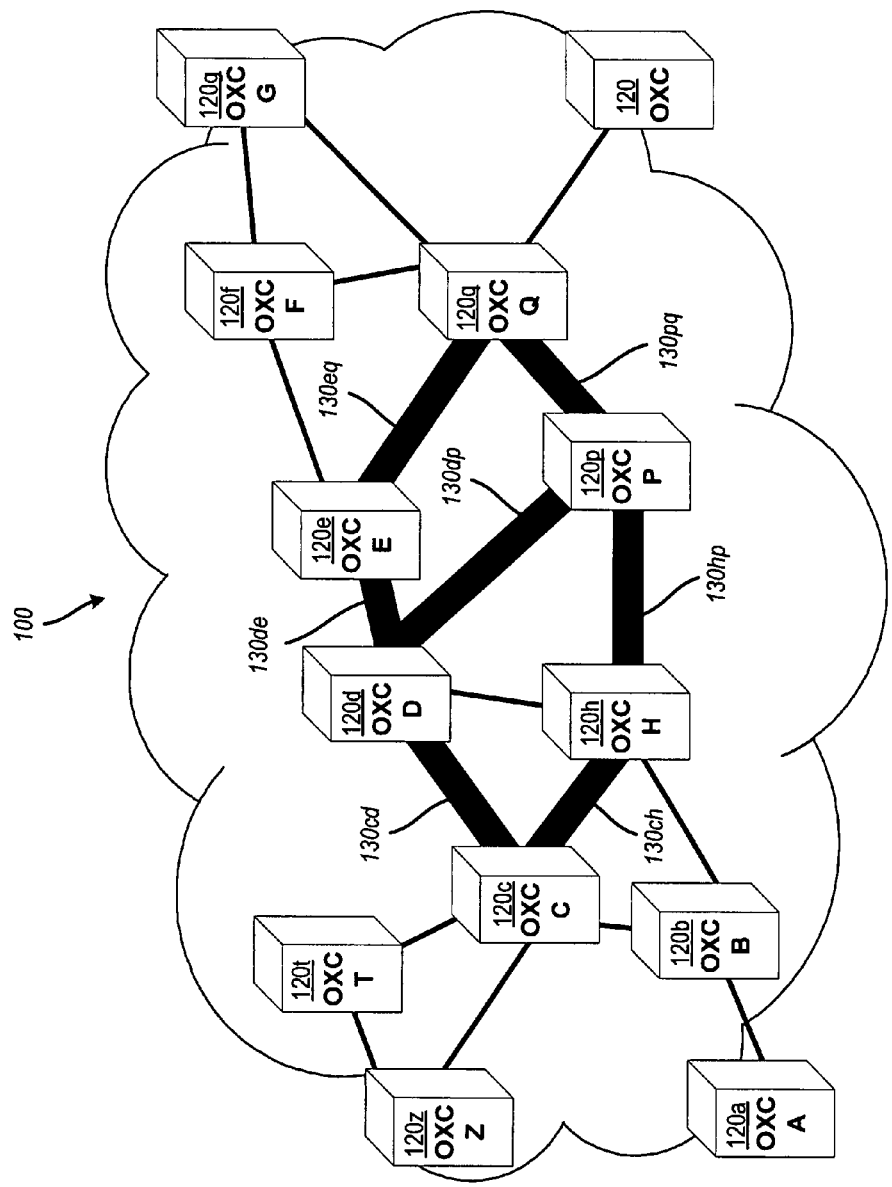
FIG. 1 is a schematic diagram illustrating an optical mesh network including a plurality of interconnected optical cross connect nodes, and also illustrating, in particular, a plurality of mesh network span links that have been configured as connection aggregation links for the purpose of treating multiple network connections as one across a network span.

Referring now to FIG. 1, an optical mesh network 100 including a plurality of interconnected optical cross connect nodes 120 is shown. The optical mesh network 100 includes a plurality of interconnected optical cross connect nodes 120. The optical mesh network 100 further includes a plurality of mesh network span links 120 that have been configured as connection aggregation links 130 for the purpose of treating multiple network connections as one across a network span.

Bundle points for connection aggregation links are determined, initialized, and managed by a network user. Optionally, auto-determination of aggregation links is implemented based on predetermined criteria. Auto-determination is, for example, implemented as a Network Management System (NMS) function to specify links 130 between nodes 120. Links may be used to aggregate existing network connections as well as be used for aggregated connection restoration.

Seven connection aggregation links 130, for example, are initialized in an optical mesh network 100 and are shown in FIG. 1. The connection aggregation link 130cd includes all network connections between nodes OXC C 120c and OXC D 120d. The connection aggregation link 130de includes all network connections between nodes OXC C 120d and OXC D 120e. The connection aggregation link 130eq includes all network connections between nodes OXC C 120e and OXC D 120q. The connection aggregation link 130pq includes all network connections between nodes OXC C 120p and OXC D 120q. The connection aggregation link 130dp includes all network connections between nodes OXC C 120d and OXC D 120p. The connection aggregation link 130ch includes all network connections between nodes OXC C 120c and OXC D 120h. The connection aggregation link 130hp includes all network connections between nodes OXC C 120h and OXC D 120p.

A bundle is, for example, established by the connection aggregation links 130cd, 130de, and 130 eq. OXC C 120c and OXC Q 120q are thus the end points to this example bundle. The network connections between nodes 120 to be bundled have a special call record reference. Connection mapping is maintained, but no information is stored for an individual connection. Connections are released as a bundle. At the bundle end point nodes, OXC C 120c and OXC Q 120q, for example, the connection is treated as an individual network connection on the incoming and outgoing ends of the bundle. In other words, between OXC C 120c and OXC Q 120q, no individual network connection is used, only reference to the connection aggregation bundle. Such a connection is identified as a separate connection. All existing SNC (Sub Network Connection) behavior is maintained.

The network connection on the bundled side, in other words, between OXC C 120c and OXC Q 120q, for example, behaves as a single SNC. A network connection in such a location will not be treated for signaling as a separate network connection.

If bundle restoration is not possible, the network connections are released individually. Restoration of a bundle is either a whole restoration or no restoration. There is no bundle fragmenting in span-based connection aggregation.

The originating and terminating nodes do not need to know about connection bundling. Connection bundling easily maps into the OTN layer. Bundling can be implemented on OTN trunks. An OTN trunk restoration may replace the connection aggregation. The restoration of trunks can be designated based on network topology. If no restoration is possible at a connection aggregation, standard mesh restoration is triggered.

If an optical cross connect node 120 is a transition node for a bundle connection (for example, 120d and 120e in the bundle from OXC C 120c and OXC Q 120q, discussed above), the node 120d and 120e shall treat a network connection as a single connection aggregation (i.e., 130cd, 130de, 130eq, 130dp). A network failure will only affect a single connection aggregation and generate one release per connection aggregation. The connection bundling is user-determined. Connections originating at the node can also use an aggregate connection line. Aggregate connections are attempting in a protection scheme prior to individual connection restoration.

If an optical cross connect node 120 is an originating node for a bundle connection (for example, 120c and 120q in the bundle from OXC C 120c and OXC Q 120q, discussed above), the behavior is the same for the bundle and individual network connections, respectfully. Failure affecting a single network connection on the unbundled side (for example, between 120q and 120g) does not affect the bundle unless all network connections included in the bundle are released. Individual network connections can be restored based on a failure outside of that bundle. Additions of new connections to the bundle are based upon availability.

In one embodiment of the present invention, an initial implementation includes the bundling of only STS-1 SNC's. The bundle size is to be fixed as either STS-3 or STS-12 channelized. Line side support of bundling is only on OC48 and OC192 lines. Different priority connections are not bundled together. Bundle connection behavior is the same as existing SNC.

A network with span-based connection aggregation commences with a generic mesh network with some network connections already existing. Connection aggregation links 130 are implemented upon the generic mesh network. Criteria for determining which links are to be configured as connection aggregation links 130 are: the minimum number of like SNC (based on size and priority); span should be between major nodes as defined by a customer; connection aggregation planning generally also includes restoration; a span should have at least one OSRP link active; and a link is designated by a network management system and connection aggregation enabled.

A method for restoring network connections using span-based connection aggregation includes identifying a network span between a first node and a second node in a mesh network with a plurality of network nodes, wherein a plurality of individual network connections traverse. Such a link is then identified as connection aggregation enabled. Any of a re-groom, revert, or restoration triggers the creation of a connection aggregation. The plurality of individual network connections in the network span is logically bundled together into a bundle, thereby providing a connection aggregation. The connection aggregation has a set-up message that includes a time slot mapping for the network connections, ENUM of the connection names, size, source and destination, and Conn Record information. Each node across the connection aggregation path terminates the signaling message and modifies it or allows it to simply pass through. The signaling message will be terminated if there is a connection being terminated on that node or if a connection is being added to the bundle.

The method for restoring network connections using span-based connection aggregation further includes managing the connection aggregation that includes the plurality of individual network connections, as a single network connection over the network span; maintaining a connection mapping, wherein the connection mapping contains information pertaining to the bundle, but not the individual network connections; defining one or more other network spans in the mesh network as a connection aggregation link to accommodate the bundle in the event of a transmission failure, whereby the bundle is subsequently remapped; and restoring the bundle of network connections over one of the one or more other connection aggregation links when network span that the bundle is traversing fails.

Figure 2:
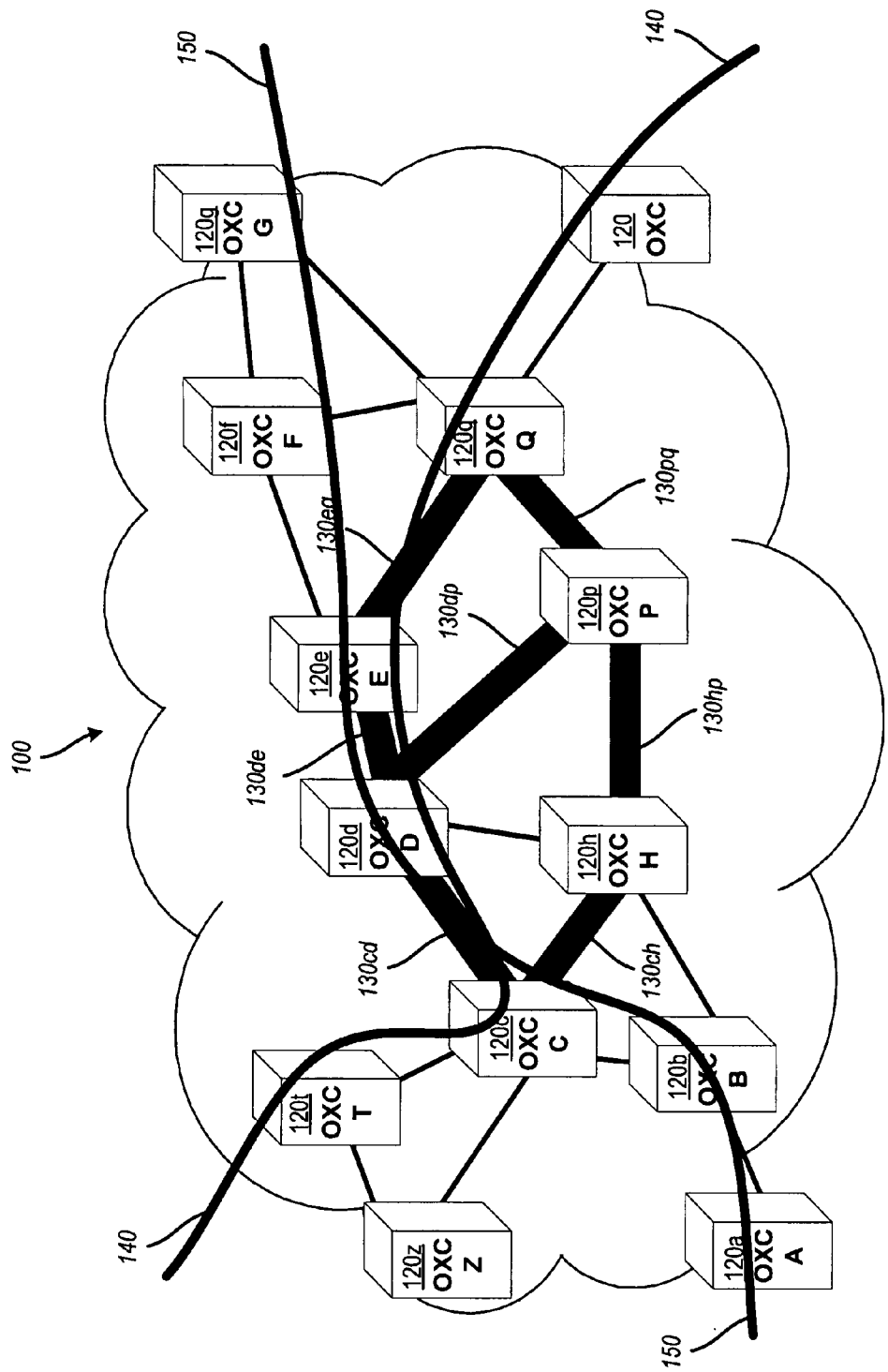
FIG. 2 is the schematic diagram illustrating the optical mesh network of FIG. 1, further illustrating two exemplary transport signal paths and their routes amongst the various optical cross connect nodes included in the optical mesh network, and further illustrating that the exemplary transport signal paths include transport across both standard mesh network links and connection aggregation links of the present invention.

Referring now to FIG. 2, an optical mesh network 100 including a plurality of interconnected optical cross connect nodes 120 is shown. The optical mesh network 100 also includes two example transport signal paths 140, 150 and their respective transport routes amongst the various optical cross connect nodes 120 included in the optical mesh network 100. The example transport signal paths 140, 150 include transport across both standard mesh network links and the connection aggregation links 130 of the present invention.

Transport signal path 140 traverses nodes 120t, 120c, 120d, 120e, 120f, and 120g. Within this sequence of nodes, links 130cd and 130de are connection aggregation links. Transport signal path 150 traverses nodes 120a, 120b, 120c, 120d, 120e, 120q, and 120. Within this sequence of nodes, links 130cd, 130de, and 130eq are connection aggregation links.

Figure 3:
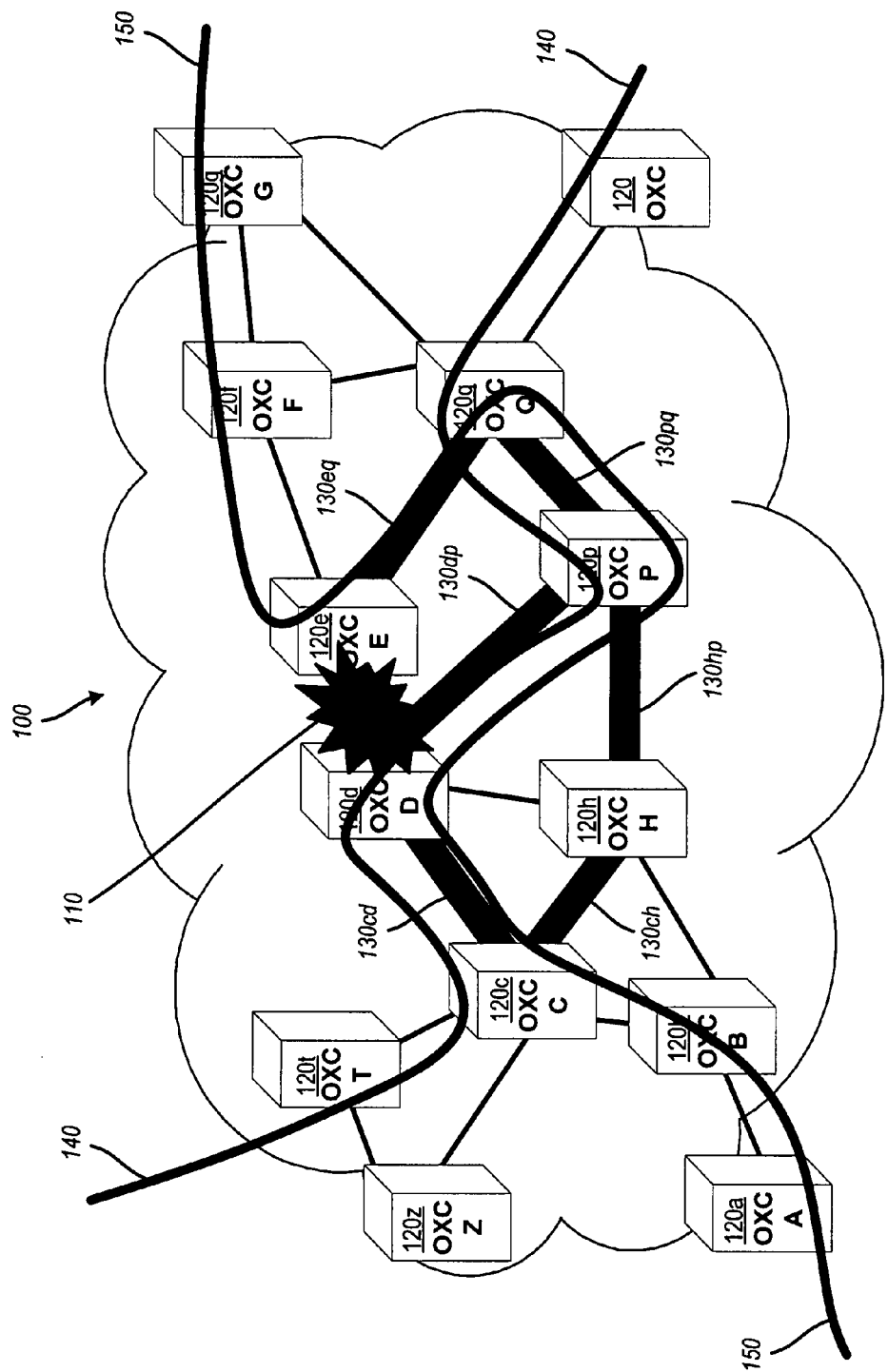
FIG. 3 is the schematic diagram illustrating the optical mesh network of FIG. 1, further illustrating a single network link failure between two optical cross connect nodes and the subsequent reroute along the connection aggregation links of the two exemplary transport signal paths illustrated in FIG. 2 as a result of the network link failure.

Referring now to FIG. 3, an optical mesh network 100 including a plurality of interconnected optical cross connects 120 is shown. The optical mesh network 100 also includes also includes two example transport signal paths 140, 150 and their respective transport routes amongst the various optical cross connect nodes 120 included in the optical mesh network 100. The example transport signal paths 140, 150 include transport across both standard mesh network links and the connection aggregation links 130 of the present invention. Illustrated in the optical mesh network 100 is a single network link failure 110 between two optical cross connect nodes 120d, 120e. Transport signal paths 140, 150 are subsequently rerouted along the connection aggregation links 130 as a result of the network link failure.

Based on the connection aggregation rerouting, transport signal path 140 traverses nodes 120t, 120c, 120d, 120p, 120q, 120e, 120f, and 120g. Within this sequence of nodes, links 130cd, 130dp, 130pq, and 130eq are connection aggregation links. Based on the connection aggregation rerouting, transport signal path 150 traverses nodes 120a, 120b, 120c, 120d, 120p, 120q, and 120. Within this sequence of nodes, links 130cd, 130dp, and 130pq are connection aggregation links.

Figure 4:
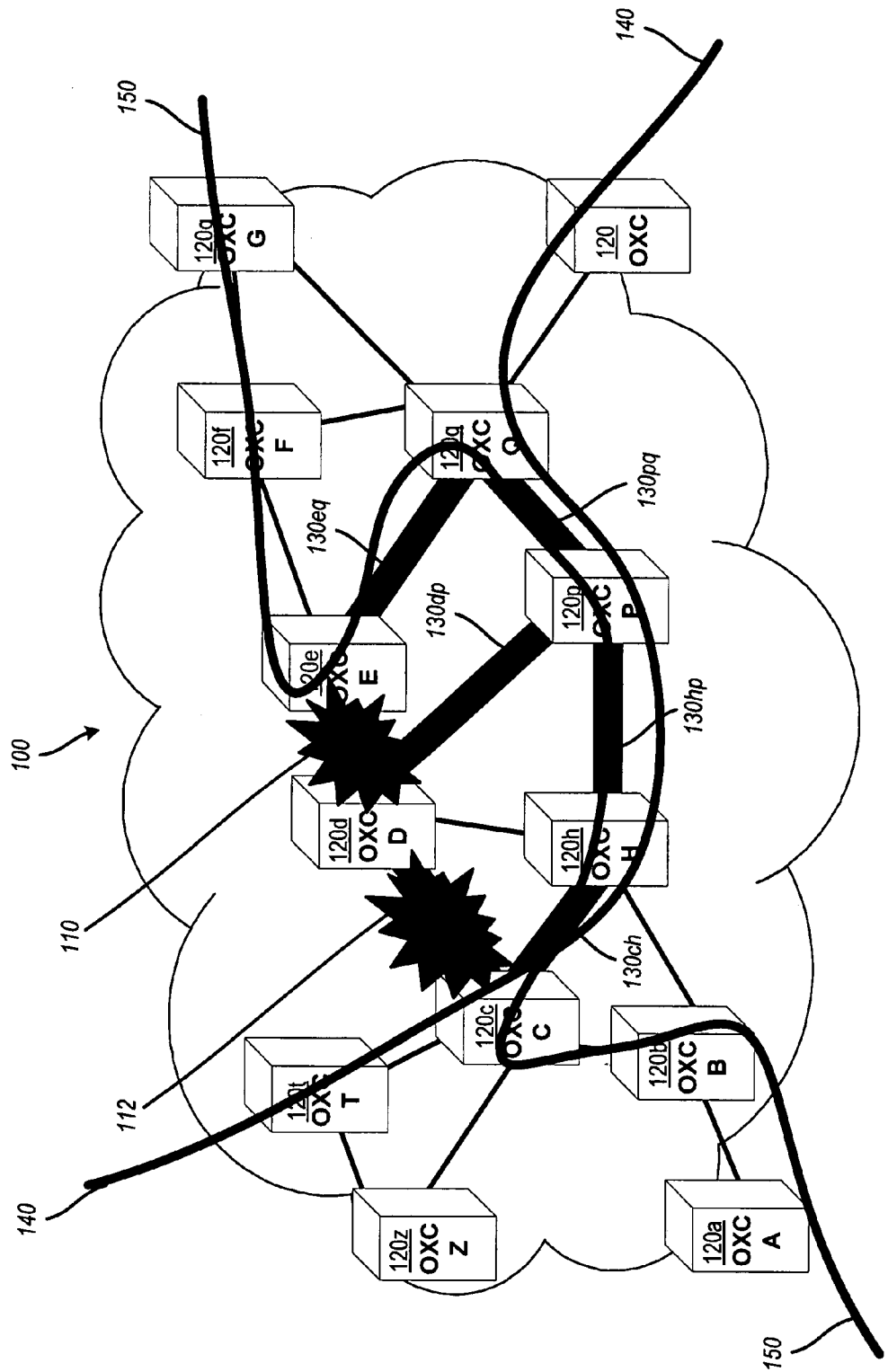
FIG. 4 is the schematic diagram illustrating the optical mesh network of FIG. 1, additionally illustrating a second network link failure between two optical cross connect nodes and the subsequent reroute along the connection aggregation links of the two exemplary transport signal paths illustrated in FIG. 3 as a result of two network link failures.

Referring now to FIG. 4, an optical mesh network 100 including a plurality of interconnected optical cross connects is shown. The optical mesh network 100 also includes also includes two example transport signal paths 140, 150 and their respective transport routes amongst the various optical cross connect nodes 120 included in the optical mesh network 100. The example transport signal paths 140, 150 include transport across both standard mesh network links and the connection aggregation links 130 of the present invention. Illustrated in the optical mesh network 100 are two network link failures 110, 112 (110 between two optical cross connect nodes 120d, 120e, and 112 between two optical cross connect nodes 120c, 120d). Transport signal paths 140, 150 are subsequently rerouted along the connection aggregation links 130 as a result of the two network link failures 110, 112.

Based on the connection aggregation rerouting, transport signal path 140 traverses nodes 120t, 120c, 120h, 120p, 120q, 120e, 120f, and 120g. Within this sequence of nodes, links 130ch, 130hp, 130pq, and 130eq are connection aggregation links. Based on the connection aggregation rerouting, transport signal path 150 traverses nodes 120a, 120b, 120c, 120h, 120p, 120q, and 120. Within this sequence of nodes, links 130ch, 130hp, and 130pq are connection aggregation links.

Figure 5:
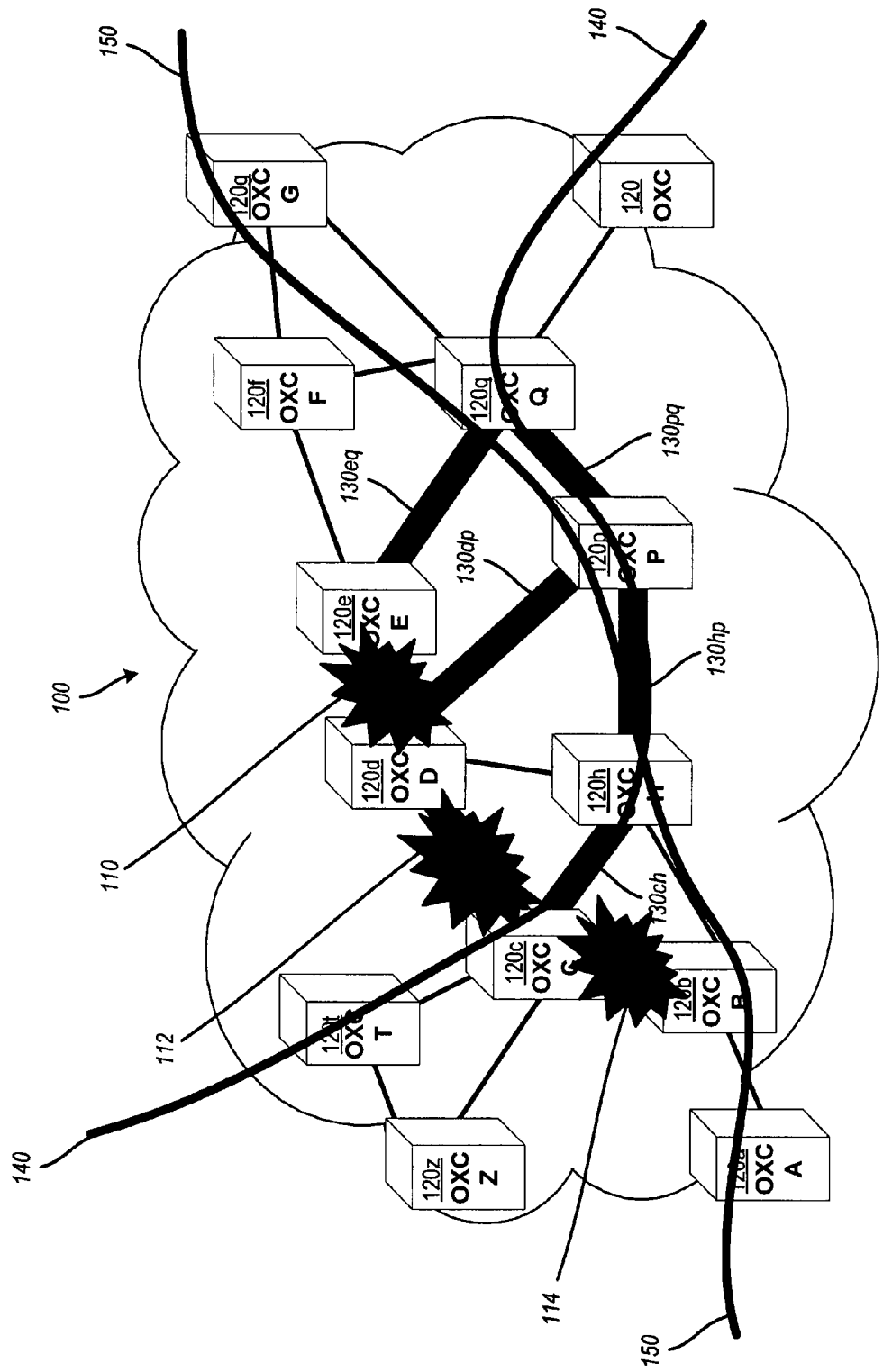
FIG. 5 is the schematic diagram illustrating the optical mesh network of FIG. 1, further illustrating a third network link failure between two optical cross connects and the subsequent reroute of the two exemplary transport signal paths illustrated in FIG. 4 as a result of three network link failures.

Referring now to FIG. 5, an optical mesh network 100 including a plurality of interconnected optical cross connects is shown. The optical mesh network 100 also includes also includes two example transport signal paths 140, 150 and their respective transport routes amongst the various optical cross connect nodes 120 included in the optical mesh network 100. The example transport signal paths 140, 150 include transport across both standard mesh network links and the connection aggregation links 130 of the present invention. Illustrated in the optical mesh network 100 are three network link failures 110, 112, 114 (110 between two optical cross connect nodes 120d, 120e; 112 between two optical cross connect nodes 120c, 120d; and 114 between two optical cross connect nodes 120b, 120c). Transport signal paths 140, 150 are subsequently rerouted along the connection aggregation links 130 as a result of the three network link failures 110, 112, 114.

Based on the connection aggregation rerouting, transport signal path 140 traverses nodes 120t, 120c, 120h, 120p, 120q, and 120g. Within this sequence of nodes, links 130ch, 130hp, 130pq, and 130eq are connection aggregation links. Based on the connection aggregation rerouting, transport signal path 150 traverses nodes 120a, 120b, 120h, 120p, 120q, and 120. Within this sequence of nodes, links 130hp and 130pq are connection aggregation links.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A method for restoring network connections using span-based connection aggregation, comprising:
    identifying a plurality of network spans between a first node and a second node in a mesh network with a plurality of network nodes, wherein a plurality of individual network connections traverse the plurality of network spans, and wherein the plurality of network spans are identified responsive to a plurality of criteria;
    logically aggregating the plurality of individual network connections in each of the plurality of network spans together into a connection aggregation link for the each of the plurality of network spans;
    logically aggregating each of the connection aggregation links into a bundle;
    managing the bundle, comprised of the plurality of individual network connections over the plurality of network spans, as a single sub network connection (SNC) over the plurality of network spans;
    maintaining a connection mapping for the bundle, wherein the connection mapping contains information pertaining to the bundle, but not the plurality of individual network connections;
    restoring the bundle responsive to a failure on the bundle, wherein the restoring is only done if the bundle can be restored in full between the first node and the second node; and
    if unable to restore the bundle, releasing the plurality of individual network connections within the bundle.

2. The method of claim 1, wherein any of an originating node and a terminating node of any of the plurality of individual network connections are unaware of the bundle.

3. The method of claim 1, wherein the plurality of criteria comprises: a minimum number of like SNCs based on size and priority; location of the plurality of network spans located between major nodes as defined by a customer; type of the restoring step; a span in the plurality of network spans having at least one OSRP (Optical Signaling and Routing Protocol) link active; and a designation by a network management system.

4. The method of claim 1, wherein each of the plurality of network nodes comprises an optical cross connect.

5. The method of claim 4, wherein the bundle comprises one or more STS-1 (Synchronous Transport Signal-1) SNCs.

6. The method of claim 5, wherein the bundle comprises a size of either STS-3 (Synchronous Transport Signal-3) channelized or STS-12 (Synchronous Transport Signal-12) channelized.

7. The method of claim 1, further comprising:
operating a signaling and routing protocol between the plurality of nodes, wherein the signaling and routing protocol treats the bundle as a single SNC.

8. The method of claim 1, wherein the first node and the second node are selected by a user.

9. A system for restoring network connections using span-based connection aggregation, comprising:
a plurality of network nodes, wherein the plurality of network nodes are configured to perform the steps of:
identifying a plurality of network spans between a first node and a second node in a mesh network of the plurality of network nodes, wherein a plurality of individual network connections traverse the plurality of network spans, and wherein the plurality of network spans are identified responsive to a plurality of criteria;
logically aggregating the plurality of individual network connections in each of the plurality of network spans together into a connection aggregation link for the each of the plurality of network spans;
logically aggregating each of the connection aggregation links into a bundle;
managing the bundle, comprised of the plurality of individual network connections over the plurality of network spans, as a single sub network connection (SNC) over the plurality of network spans;
maintaining a connection mapping for the bundle, wherein the connection mapping contains information pertaining to the bundle, but not the plurality of individual network connections;
restoring the bundle responsive to a failure on the bundle only if the bundle can be restored in full between the first node and the second node; and
releasing the plurality of individual network connections within the bundle if unable to restore the bundle in full.

10. The system of claim 9, wherein any of an originating node and a terminating node of any of the plurality of individual network connections are unaware of the bundle.

11. The system of claim 9, wherein the plurality of criteria comprises: a minimum number of like SNCs based on size and priority; location of the plurality of network spans between major nodes as defined by a customer; type of the restoring step; a span in the plurality of network spans having at least one OSRP (Optical Signaling and Routing Protocol) link active; and a designation by a network management system.

12. The system of claim 9, wherein each of the plurality of network nodes comprises an optical cross connect.

13. The system of claim 12, wherein the bundle comprises one or more STS-1 (Synchronous Transport Signal-1) SNCs.

14. The system of claim 13, wherein the bundle comprises a size of either STS-3 (Synchronous Transport Signal-3) channelized or STS-12 (Synchronous Transport Signal-12) channelized.

15. The system of claim 9, wherein the plurality of network nodes is further configured to perform the step of:
operating a signaling and routing protocol between the plurality of nodes, wherein the signaling and routing protocol treats the bundle as a single SNC.

16. The system of claim 9, wherein the first node and the second node are selected by a user.

17. An optical network, comprising:
a plurality of interconnected nodes;
a plurality of connection aggregation links between the plurality of interconnected nodes, a connection aggregation link of the plurality of connection aggregation links treats multiple network connections across the connection aggregation link as a single sub network connection (SNC) comprising a bundle;
bundle points at a first node and a second node of the plurality of interconnected nodes, the bundle points determined by a plurality of criteria; and
a signaling and routing protocol between the plurality of interconnected nodes; and
wherein the plurality of interconnected nodes are configured to first restore the bundle in full responsive to a failure, and if not able to restore the bundle in full, to release all of the multiple network connections to individually mesh restore.

* * * * *